United States Patent
He et al.

(10) Patent No.: US 10,198,425 B2
(45) Date of Patent: *Feb. 5, 2019

(54) METHODS AND APPARATUS FOR REUSING REPORT DESIGN COMPONENTS AND TEMPLATES

(71) Applicant: Open Text Holdings, Inc., San Mateo, CA (US)

(72) Inventors: Wenbin He, Foster City, CA (US); Wenfeng Li, Foster City, CA (US); Rima Kanguri, Foster City, CA (US); Yu Li, Shanghai (CN)

(73) Assignee: Open Text Holdings, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,567

(22) Filed: Jul. 7, 2016

(65) Prior Publication Data

US 2016/0321235 A1 Nov. 3, 2016

Related U.S. Application Data

(63) Continuation of application No. 12/130,845, filed on May 30, 2008, now Pat. No. 9,411,798.

(60) Provisional application No. 60/933,263, filed on Jun. 4, 2007.

(51) Int. Cl.
*G06F 17/00* (2006.01)
*G06F 17/24* (2006.01)
*G06F 17/30* (2006.01)

(52) U.S. Cl.
CPC ...... *G06F 17/248* (2013.01); *G06F 17/30554* (2013.01); *G06F 17/241* (2013.01)

(58) Field of Classification Search
None
See application file for complete search history.

(56) References Cited

U.S. PATENT DOCUMENTS

| | | |
|---|---|---|
| 5,819,293 A | 10/1998 | Comer et al. |
| 6,195,665 B1 | 2/2001 | Jarett |
| 7,197,696 B1 | 3/2007 | Muzumdar |
| 7,475,062 B2 | 1/2009 | de Souza |
| 7,584,425 B2 | 9/2009 | Nader et al. |
| 7,720,885 B2 * | 5/2010 | Jones ............... G06F 17/212 707/804 |
| 7,765,274 B2 | 7/2010 | Kasriel et al. |
| 7,810,027 B2 * | 10/2010 | Bendik ............. G06F 17/248 715/200 |

(Continued)

OTHER PUBLICATIONS

Google Docs Tour Create documents, spreadsheets and presentations online printed on Oct. 1, 2009 from website http://www.google.com/google-d-s/intl/en/tour1.html 1 pg.

(Continued)

*Primary Examiner* — Howard Cortes
(74) *Attorney, Agent, or Firm* — Sprinkle IP Law Group

(57) ABSTRACT

The disclosed embodiments enable a report to be generated using a template. The template may include one or more properties for which for which corresponding values are to be inherited by each copy of the template. A value of a property that is inherited may be overridden by modifying the inherited value. A copy of a template may be incorporated into a report design. Conversely, at least a portion of a report design may be saved as a template.

28 Claims, 13 Drawing Sheets

(56) References Cited

U.S. PATENT DOCUMENTS

| | | | |
|---|---|---|---|
| 7,870,478 B1* | 1/2011 | Chiaro, Jr. | G06F 17/2229 715/223 |
| 2004/0088650 A1 | 5/2004 | Killen et al. | |
| 2004/0122830 A1 | 6/2004 | Schwartz et al. | |
| 2004/0210547 A1 | 10/2004 | Wentland et al. | |
| 2004/0254953 A1 | 12/2004 | Vincent | |
| 2004/0268238 A1 | 12/2004 | Liu et al. | |
| 2005/0065936 A1 | 3/2005 | Goering | |
| 2005/0203819 A1 | 9/2005 | Rogers et al. | |
| 2006/0041539 A1 | 2/2006 | Matchett et al. | |
| 2006/0064428 A1 | 3/2006 | Colaco et al. | |
| 2006/0112329 A1 | 5/2006 | Collie et al. | |
| 2006/0143220 A1* | 6/2006 | Spencer, Jr. | G06F 8/20 |
| 2006/0197982 A1 | 9/2006 | Bell et al. | |
| 2007/0016561 A1 | 1/2007 | Laustsen | |
| 2007/0203935 A1 | 8/2007 | de Souza | |
| 2007/0255722 A1 | 11/2007 | Leffert et al. | |
| 2007/0283273 A1 | 12/2007 | Woods | |

OTHER PUBLICATIONS

Crystal Decisions, "Crystal Reports 9 Template Using Templates for Increased Productivity" article dated Sep. 27, 2002 6 pgs.

SAP, "Crystal Reports and Xcelsius Software: Powerful Dashboarding and Reporting for it and Business Users" printed on Oct. 5, 2009 from website http://www.sap.com/solutions/sapbusinessobjects/sme/reporting-dashboarding/index.epx pp. 1-2.

SriSamp, Code Project, "Building Reusable Components in NET" article posted Apr. 21, 2003 on website http://www.codeproject.com/KB/vb/reuse.aspx (printed on Oct. 1, 2009) pp. 1-6.

Dan O'Connell and Dan Melcher, "Reusable Reporting", dated Nov. 1, 2007 http://reusablreporting.blogspot.com/ (printed Oct. 1, 2009) pp. 1-11.

Office Action issued for U.S. Appl. No. 12/130,845, dated Oct. 11, 2011, 20 pages.

Office Action issued for U.S. Appl. No. 12/130,845, dated Apr. 30, 2012, 23 pages.

Office Action issued for U.S. Appl. No. 12/130,845, dated Oct. 12, 2012, 26 pages.

Office Action issued for U.S. Appl. No. 12/130,845, dated Jul. 18, 2013, 39 pages.

Office Action issued for U.S. Appl. No. 12/130,845, dated Mar. 4, 2014, 44 pages.

Office Action issued for U.S. Appl. No. 12/130,845, dated Aug. 19, 2014, 48 pages.

Office Action issued for U.S. Appl. No. 12/130,845, dated Feb. 12, 2015, 49 pages.

Office Action issued for U.S. Appl. No. 12/130,845, dated Jun. 2, 2015, 44 pages.

MSDN, Lab 10: Creating and Inserting InfoPath 2007 Template Parts, Feb. 200, pp. 1-5.

Scott, Roberts et al., "Designing Forms for Microsoft InfoPath and Form Services 2007," Feb. 2007, Addison-Wesley, pp. 431-454.

Gamble, Mark, "Using Eclipse BIRT Report Libraries and Templates," Jan. 1, 2006, www.theserverside.com, pp. 1-19.

Peh, Diana, et al., "BIRT: A Field Guide to Reporting," Oct. 2006, Addison-Wesley, 695 pages.

* cited by examiner

*Figure 11*

| CUSTOMERNUMBER | CUSTOMERNAME | CREDITLIMIT |
|---|---|---|
| Australia | | |
| 114 | Australian Collectors, Co. | 117300 |
| 276 | Anna's Decorations, Ltd | 107800 |
| 282 | Souveniers And Things Co. | 92200 |
| 333 | Australian Gift Network, Co. | 51600 |
| 471 | Autralian Collectables, Ltd. | 60300 |
| | | 8254400 |
| Austria | | |
| 382 | Salzburg Collectables | 71700 |
| 452 | Mini Auto Werks | 45300 |
| | | 8254400 |
| Belgium | | |
| 314 | Petit Auto | 79900 |
| 381 | Royale Belge | 23500 |
| | | 8254400 |
| Canada | | |
| 202 | Canadian Gift Exchange Network | 90300 |
| 233 | Quebec Home Shopping Network | 48700 |

*Figure 13*

| CUSTOMERNUMBER | CUSTOMERNAME | CREDITLIMIT |
|---|---|---|
| Australia | | |
| 114 | Australian Collectors, Co. | 117300 |
| 276 | Anna's Decorations, Ltd | 107800 |
| 282 | Souveniers And Things Co. | 92200 |
| 333 | Australian Gift Network, Co. | 51600 |
| 471 | Autralian Collectables, Ltd. | 60300 |
| | | 8254400 |
| Austria | | |
| 382 | Salzburg Collectables | 71700 |
| 452 | Mini Auto Werks | 45300 |
| | | 8254400 |
| Belgium | | |
| 314 | Petit Auto | 79900 |
| 381 | Royale Belge | 23500 |
| | | 8254400 |
| Canada | | |
| 202 | Canadian Gift Exchange Network | 90300 |
| 233 | Quebec Home Shopping Network | 48700 |

1302

METHODS AND APPARATUS FOR REUSING REPORT DESIGN COMPONENTS AND TEMPLATES

RELATED APPLICATIONS

This application is a continuation of and claims a benefit of priority from U.S. patent application Ser. No. 12/130,845, filed May 30, 2008, entitled "METHODS AND APPARATUS FOR REUSING REPORT DESIGN COMPONENTS AND TEMPLATES," which claims the benefit of priority to Provisional Application No. 60/933,263, filed on Jun. 4, 2007, entitled "METHODS AND APPARATUS FOR REUSING REPORT DESIGN COMPONENTS AND TEMPLATES," which are incorporated herein by reference for all purposes.

BACKGROUND OF THE INVENTION

The disclosed embodiments relate to computer-implemented systems and methods for use in designing or generating a report. More specifically, the disclosed embodiments relate to reusable components and templates that can be used to generate or modify a report.

A user can view a report that presents data in a particular format. However, a user is typically unable to modify the data being viewed, the analysis of the data, or the format of the report. Rather, the user must typically choose to generate another report using a different report design that has been generated by a report developer. Due to the varying needs of users, report developers must create different report designs to accommodate the requests of the users generating reports from the report designs. Moreover, since the needs of users vary over time, the report designs often need to be continually updated accordingly. As a result, creating and maintaining the report designs is a time-consuming process.

SUMMARY OF THE INVENTION

The disclosed embodiments enable a report to be generated using a template and/or report library. For instance, a report library may be a repository for storing reusable design components, which may include report designs and/or report items.

In accordance with one embodiment, a template may have associated therewith one or more properties for which corresponding values are to be inherited by each copy of the template. Similarly, a report item may have associated therewith one or more properties for which corresponding values are to be inherited by each copy of the report item. A value of a property that is inherited may be overridden by modifying the inherited value.

In accordance with one aspect of the invention, at least a portion of a report design may be saved as a template, where the report design includes a report layout indicating a format in which one or more data items are to be presented. More particularly, a method of generating a template for use in generating a report may include obtaining at least a portion of a report design, where the report design includes a report layout indicating a format in which one or more data items are to be presented. The at least a portion of the report design may be saved as a template, wherein the template has one or more properties for which corresponding values are to be inherited by each copy of the template.

In accordance with another aspect of the invention, a copy of a template may be incorporated into a report design. More particularly, a method of generating a report design may include copying a template from a set of one or more templates, wherein each of the templates has one or more properties for which values are inherited by a copy of the corresponding one of the templates. The template copy may be incorporated into a report design, the report design including a report layout indicating a format in which one or more data items are to be presented, wherein the template copy inherits a value for each of the properties of the template.

In accordance with yet another aspect of the invention, a template may be copied and modified to generate another template. More particularly, a method of generating a report template may include copying a template from a set of one or more templates, wherein each of the templates has one or more properties for which values are to be inherited by a copy of the corresponding one of the templates that has been incorporated into a report design. A value of at least one of the properties of the template copy may be modified. The modified template copy may then be saved as an additional template in a set of templates.

In accordance with yet another aspect of the invention, instructions may be associated with a template or a copy of the template. In accordance with one embodiment, a method of generating a report template may include copying a template from a library including one or more templates, wherein each of the templates has one or more properties for which values are to be inherited by a copy of the corresponding one of the templates. One or more instructions may be received such that the instructions are associated with at least a portion of the template copy. The template copy and the associated instructions may then be saved an additional template in a set of templates.

In accordance with another aspect of the invention, the disclosed embodiments pertain to a system operable to perform and/or initiate any of the disclosed methods. The system may also include one or more processors or one or more memories. At least one of the memories or processors may be adapted to provide at least some of the disclosed method operations. In yet a further embodiment, the invention pertains to a computer program product for performing the disclosed methods. The computer program product has at least one computer readable medium and computer program instructions stored within the computer readable product configured to perform at least some of the above described method operations. In still further embodiments, the disclosed embodiments pertain to data structures and user interfaces used to perform the disclosed methods.

These and other features of the disclosed embodiments will be presented in more detail in the following detailed description and the associated figures.

BRIEF DESCRIPTION OF THE DRAWINGS

FIG. 11 is a graphical user interface illustrating the results of overriding an inherited property as shown in FIG. 10.

FIG. 13 is a graphical user interface illustrating the properties that are inherited from the modified report item shown in FIG. 12.

DESCRIPTION OF EXAMPLE EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
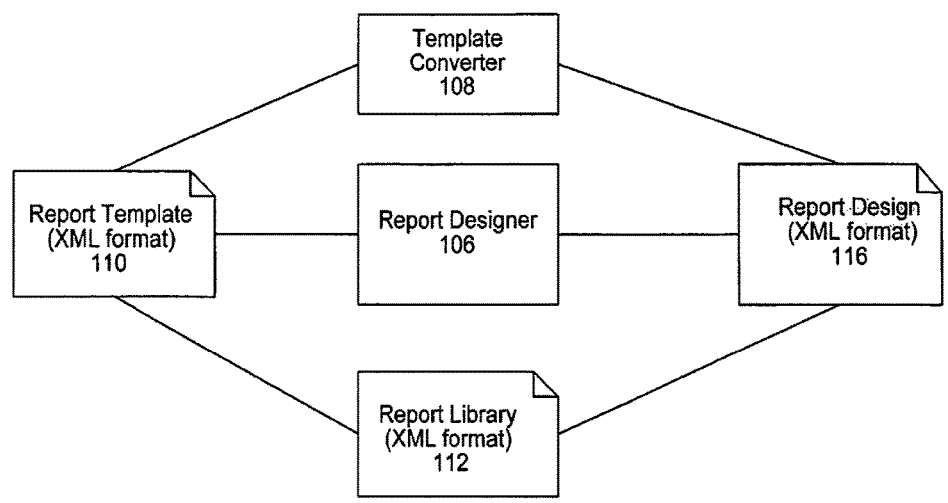
FIG. 1 is a diagram illustrating an example system in which embodiments of the invention may be implemented.

FIG. 1 is a block diagram illustrating an example system in which embodiments of the invention may be implemented. System 102 may include a Report Designer 104 capable of generating a Report Design 106. The Report Designer 104 may be a software tool that may be used to create a Report Design 106 in XML format. For instance, the Report Designer may be a Business Report Designer such as BRD or BRDPro, available from Actuate Corporation, located in San Francisco, Calif. Upon being generated, the Report Design 106 includes a report layout indicating a format in which one or more data items are to be presented. For instance, the data items may be identified by one or more data fields, which may be associated with one or more databases. The Report Design 106 may be generated in the form of an XML document that, when executed, obtains data from one or more sources and generates a report that is viewable by a user. The report may be one of a variety of report types. For instance, the type of report may be a spreadsheet, a grid, simple listing report, grouped listing report, crosstab report, etc.

The System 102 may further include a Template Converter 108, which is operatively coupled to the Report Designer 104. The Template Converter 108 may enable a template to be generated. A template may be used as a "starter" report design in order to help report developers to create reports. More particularly, a user may generate a template such as Report Template 110, which may be stored in a set of templates. The set of templates may be stored in a Library such as Report Library 112, which may contain a collection of reusable report design components. These reusable design components may be stored as one or more files. In one embodiment, the Report Library 112 includes report designs, as well as report templates. In other embodiments, report designs may be stored separately from report templates.

The Report designer 104 may import the Report Template 110 into a new report design. For example, the Report Designer 104 may access the Report Template 110 from the Library 112, as well as templates from other libraries, in order to generate a new report design. As a result, the Report Design 106 may reference one or more libraries.

A user may generate the Report Template 110 from one or more reusable design components from one or more libraries. As a result, the Template may reference one or more libraries. In addition, a user may access templates such as the Report Template 110 from the Library 112 for modification. Once modified, the Report Template 110 may be stored back to the Library 112. A template may be stored in the form of an XML file that, when executed, may generate a report that is viewable by a user. If the template references one or more data fields, data corresponding to those data fields may be obtained from the appropriate sources (e.g., databases) when the template is executed.

Conversion performed by the Template Converter 108 may include conversion of a Report Design 116 or portion thereof to a template. The Report Design 116 may be provided to, retrieved by, or otherwise received by the Template Converter 108 for conversion. Conversion of a Report Design 116 or portion thereof to a template may include a variety of processes, such as associating instructions for customizing one or more items in the template and/or associating one or more default properties and corresponding value(s) (e.g., of one or more items in the report design) with one or more items in the template. The default properties and corresponding values of a template may be inherited by any copies of the template. However, these properties and corresponding values may be overridden by new values. Once these new values are cleared, the default properties and corresponding values may be applied. An item in the Report Design 116 may be referred to as a report item. Thus, a report item may identify one or more data items and/or associated formatting information indicating a format in which one or more data items are to be presented. When an entire Report Design 116 is converted to a template, the template may be referred to as a template report. Similarly, when a report item is converted to a template, the template may be referred to as a template report item. Any resulting template may be stored to the Library 112.

The Report Designer 104 may also retrieve, obtain, or otherwise receive a template from the Library 112. Alternatively, the Report Designer 104 may also retrieve, obtain, or otherwise receive a template from the Template Converter 108. The Report Designer 104 may include a template such as Template 110 in the Report Design 106 that is generated. For instance, a user may select a template via a variety of user interfaces for inclusion in a report design. As one example, the user may drag and drop a selected template or a copy of the selected template into a particular report design. In this manner, the user may also modify a copy of a selected template that has been incorporated into the report design.

In accordance with various embodiments, templates in the Library 112 have inheritance properties. More particularly, when one of the templates in the Library 112 is copied (e.g., instantiated), the template copy (i.e., instance) inherits values of one or more properties of the template. Examples of such properties include background color, font type, font color, and other formatting information. Although the template copy inherits a value for one or more properties of the template, these values may be overridden when the value of one or more of the properties of the template copy is changed by a user.

In one embodiment, when a value of one of the properties of the original report item is modified and returned to a Report Library including one or more reusable design components, the modified value may be inherited by the value of the corresponding property of an extended report item (e.g., report item copy) that has been incorporated into a report design (e.g., a report item of a report design), where the extended report item extends to the report item in the Library 112. However, this modified value may not be inherited if the value of this particular property of the extended report item has already been modified by a user. In this manner, a default value of a property of a report item in a report library may be overridden for a particular extended report item that extends to that report item in the Library 112.

In another embodiment, when a value of one of the properties of the original template (e.g., template report item) is modified and returned to the set of templates 112, the modified value may be inherited by the value of the corresponding property of the template copy that has been incorporated into a report design (e.g., a report item of a report design). However, this modified value may not be inherited if the value of this particular property of the template copy that has been incorporated into a report design (e.g., a report item of a report design) has already been modified by a user. In this manner, a default value of a property of a template may be overridden for a particular instance of the template that has been incorporated into a report design (e.g., a report item of a report design).

Figure 2:
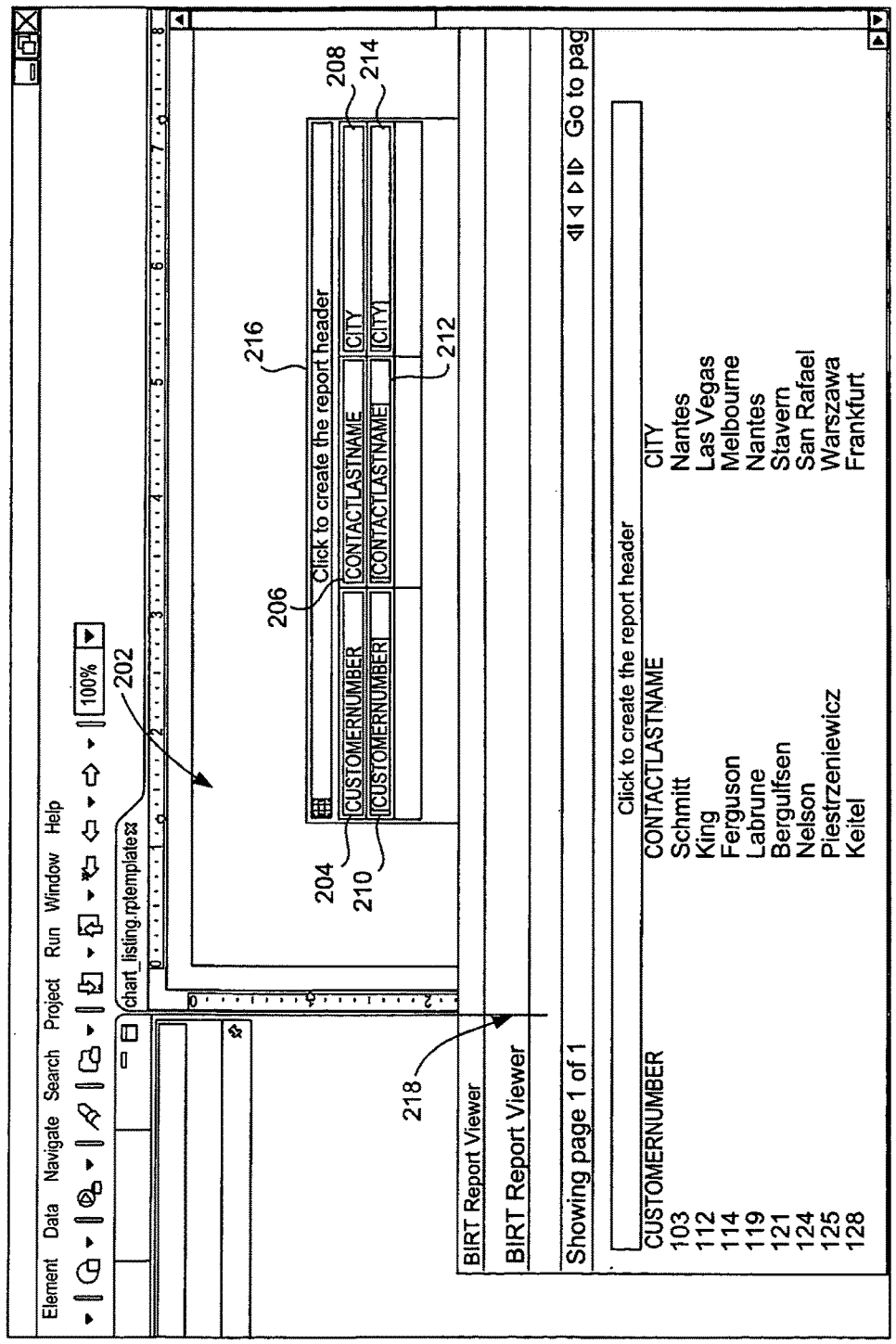
FIG. 2 is an example report design that uses a template that can be implemented in accordance with various embodiments of the invention.

FIG. 2 is a screen shot illustrating an example report design that incorporates a template. As shown at 202, a template may be complete at any level. In other words, the template need not include a specific number of data items or other information. Moreover, the template need not have a particular format. In this example, the template 202 indicates a format in which several data items are to be presented. More particularly, the template 202 includes column headers "CUSTOMERNUMBER" 204, "CONTACTLASTNAME" 206, and "CITY" 208 and corresponding data items identifying data fields CUSTOMERNUMBER 210, CONTACTLASTNAME 212, and CITY 214. In addition, the template 202 or portion thereof may have instructions associated therewith. For instance, in this example, instructions 216 instruct a user to "Click to create the report header." Thus, a user may modify a report design according to the instructions associated with the template 202. Once a report design created using the template 202 is executed, a report may be generated using data obtained from one or more sources (e.g., databases). An example report that may be generated from the template 202 is shown at 218. As shown, the report 218 includes multiple rows of data corresponding to the data fields 210, 212, 214.

Figure 3:
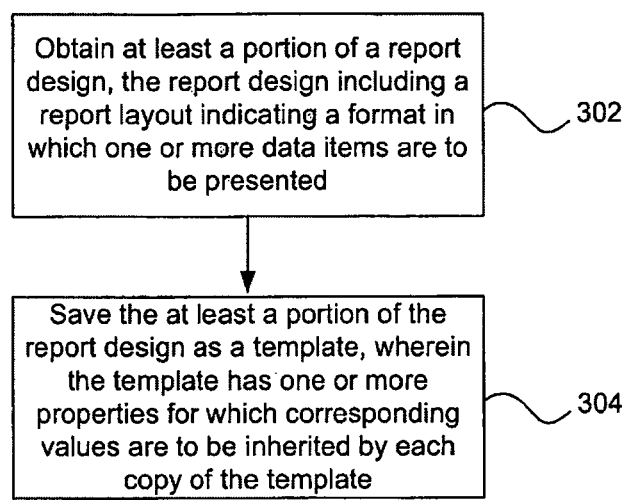
FIG. 3 is a process flow diagram illustrating an example method of generating a template from a report design.

A template such as that shown and described with reference to FIG. 2 may be generated from at least a portion of a report design. FIG. 3 is a process flow diagram illustrating a method of generating a template from a report design in accordance with one embodiment. At least a portion of a report design may be obtained at 302, where the report design includes a report layout indicating a format in which one or more data items are to be presented. At least a portion of the report design may then be saved as a template at 304, where the template has one or more properties for which corresponding values are to be inherited by each copy of the template. As set forth above, a template report may include one or more template report items, which may serve as placeholders with instructions on how to customize the template report items.

A template may be referred to as a template report (e.g., where the template is generated from a complete report design or where the template can be used to generate a complete report) or a template report item of a template report (e.g., where the template is generated from a portion of a report design or where execution of the template will result in the generation of a portion of what would be considered a complete report). A template report item may be converted from any report item of a report design. When a report item is converted into a template report item, the properties and corresponding values of the report item may become the default properties and corresponding values of the template report item.

Figure 4:
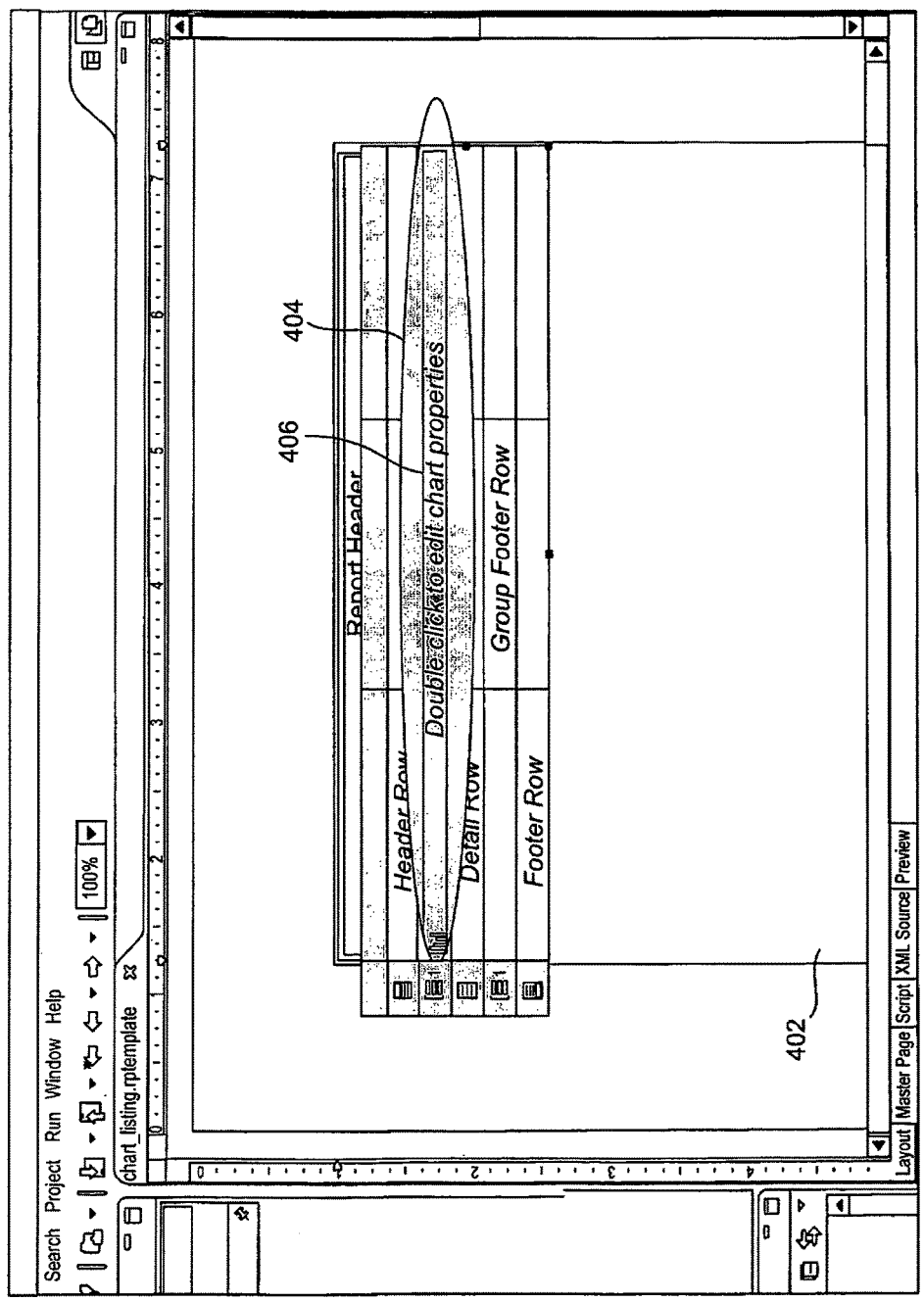
FIG. 4 is an example template report item including corresponding instructions.

FIG. 4 is a screen shot illustrating an example template report item 402 that may be displayed as a placeholder with associated instructions. A portion of the template report may be converted to (e.g., saved as) a Template Report Item 404, which serves as a placeholder for a Report Header in this example. Instructions 406 may also be provided in association with the Template Report Item 404.

Figure 5:
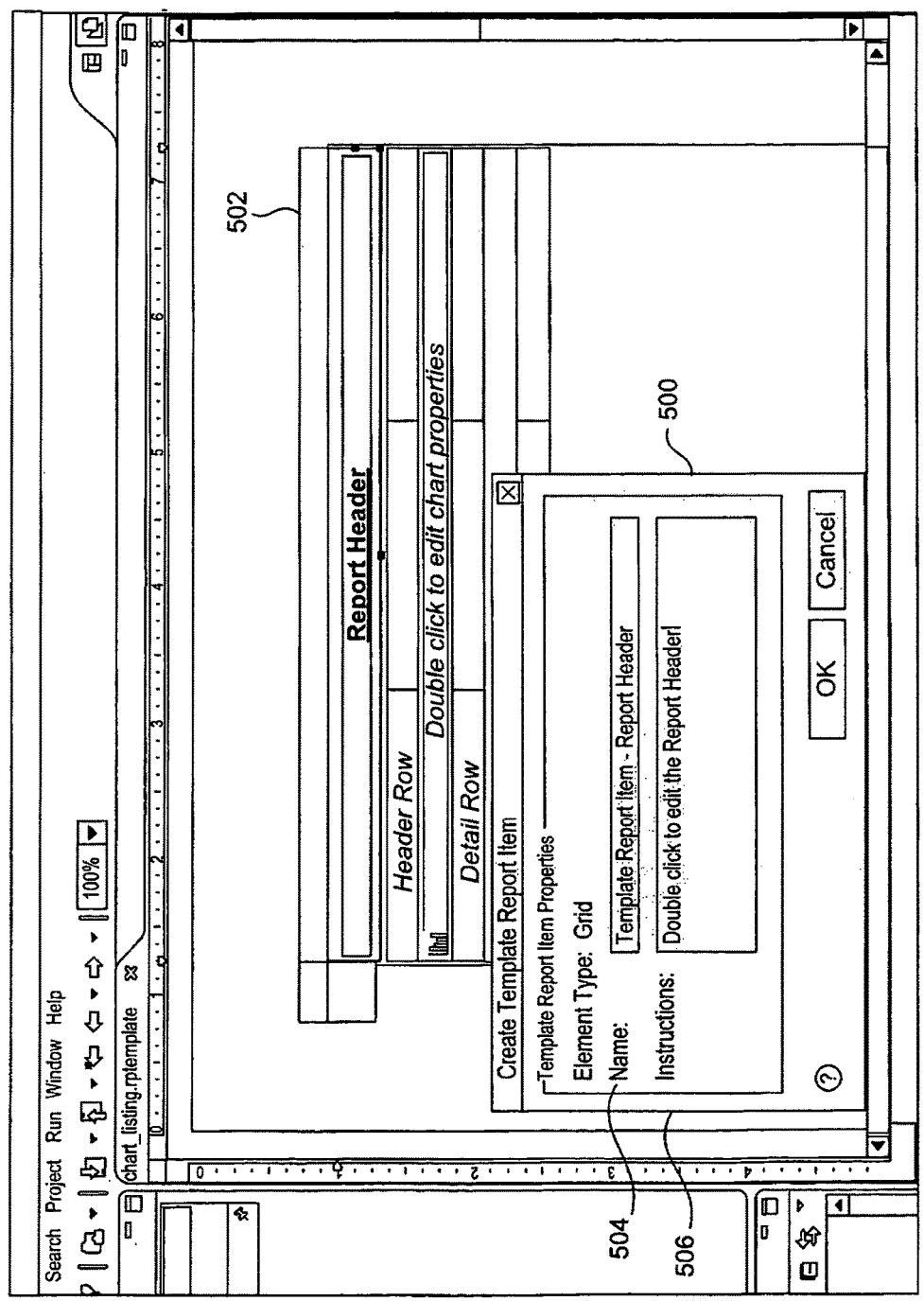
FIG. 5 is an example of a graphical user interface for converting a report item into a template report item.

FIG. 5 is a screen shot illustrating an example dialog box 500 for converting a report item into a template report item, and instructions associated with the template report item on how to customize the template report item. One or more template report items may be saved in a template report design file. In one embodiment, a template report including zero or more template report items such as the template report item shown in FIG. 5 may be saved in a template report design file. The template report and/or template report item may be saved to a set of templates. Using the dialog box 500, a portion of the report template such as that shown at 502 may be saved as a template report item by saving a portion of the report design in association with a template report item name 504. For instance, the template report item may be saved in association with its name 504 in a set of templates. As shown in this example, the portion of the report design that is saved as a template report item is the Report Header 502. Instructions 506 may also be provided in association with the template report item. More particularly, the instructions 506 may include instructions for completion or modification of a portion (e.g., field) of the template report item.

In one embodiment, the template report item has a corresponding element type. In this example, the element type is of type "Grid." In addition to the name 504 and/or instructions 506, the template report item may have other properties associated therewith.

As set forth above, at least a portion of the report design may be saved as a template with one or more instructions, where the instructions are associated with at least a portion of the template. The template may then be saved in a template library.

Figure 6:
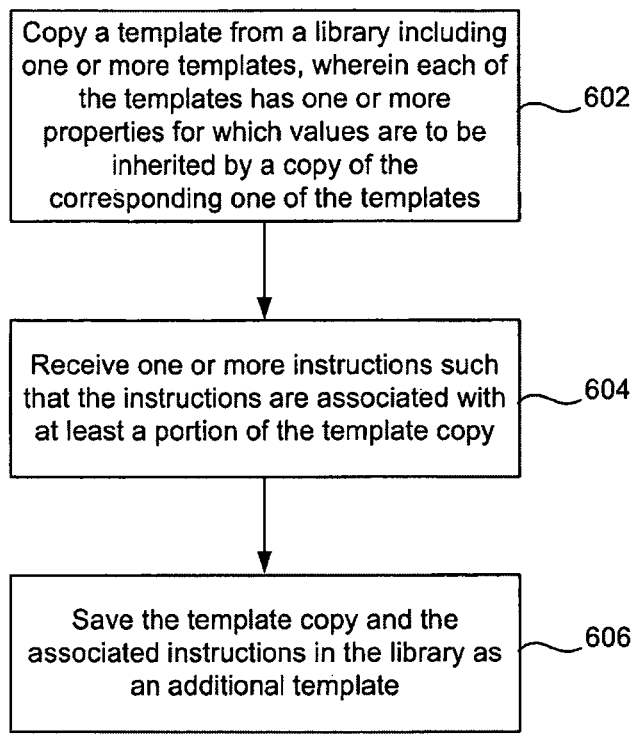
FIG. 6 is a process flow diagram illustrating a method of generating a template with instructions in accordance with various embodiments of the invention.

FIG. 6 is a process flow diagram illustrating an example method of generating a template (e.g., template report item) with instructions. In this example, the instructions are associated with a copy of the template (e.g., template report item), rather than the original template (e.g., template report item). A template (e.g., template report item) may be copied from a set of one or more templates at 602. As set forth above, each of the templates (e.g., template report items) may have one or more properties for which values are to be inherited by a copy of the corresponding one of the templates (e.g., template report items). Thus, each value of the properties of the template (e.g., template report item) may be inherited by a copy of the template (e.g., when the template is copied). One or more instructions may be received at 604 such that the instructions are associated with at least a portion of the template copy (e.g., template report item copy). The template copy and the associated instructions may then be saved in a set of templates as an additional template at 606. Instructions may also be associated with an existing template in a similar manner. Accordingly, at least one of the templates in the set of templates may have one or more instructions associated therewith.

Figure 7:
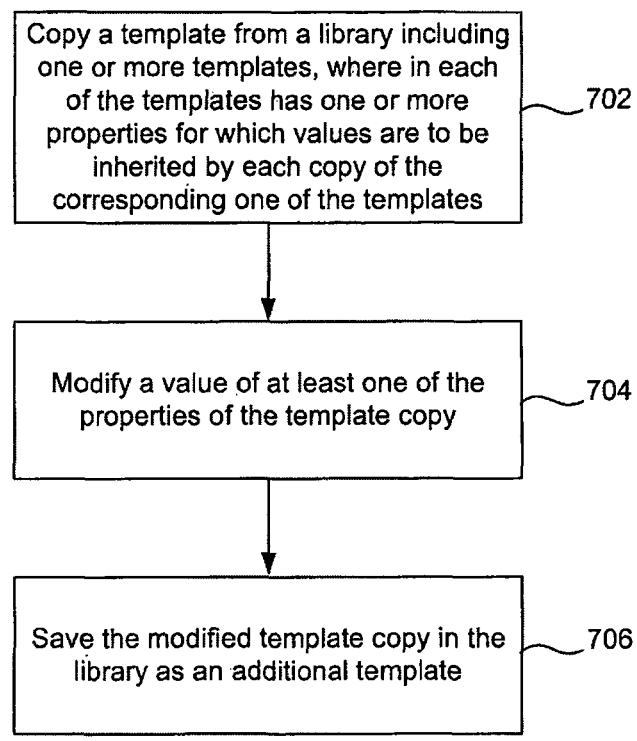
FIG. 7 is a process flow diagram illustrating an example method of generating a first template from a second template.

It is also possible to generate a new template (e.g., report item) from an existing template (e.g., report item or report template). FIG. 7 is a process flow diagram illustrating a method of generating a first template from second template. A template may be copied from a set of one or more templates at 702, where each of the templates has one or more properties for which values are to be inherited by each copy of the corresponding one of the templates. Once a template copy exists, a value of at least one of the properties of the template copy may be modified at 704. The modified template copy may then be in a set of templates an additional template at 706.

Figure 8:
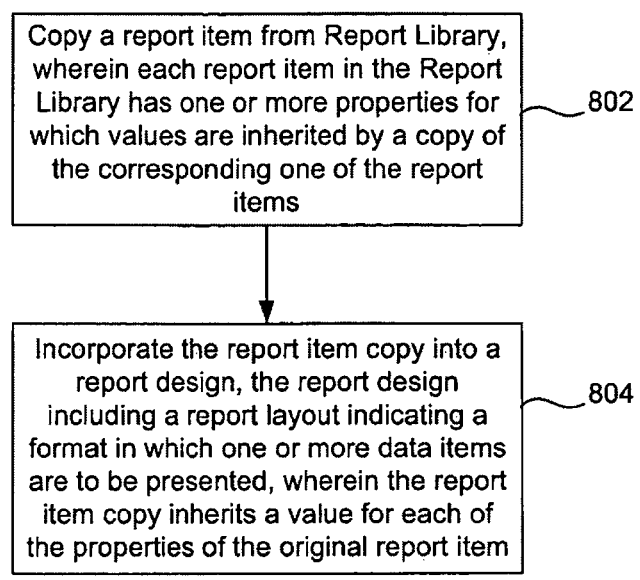
FIG. 8 is a process flow diagram illustrating an example method of generating a report design.

A report design may also incorporate one or more report items. FIG. 8 is a process flow diagram illustrating an example method of generating a report design from an existing report item. A template may be copied at 802 from a Report Library storing one or more report items, wherein each of the report items has one or more properties for which values are inherited by each extended report item (e.g., copy of the original report item) that "extends" the original report item in the Report Library. The report item may then be incorporated into a report design at 804, the report design including a report layout indicating a format in which one or more data items are to be presented. The extended report item may inherit a value for each of the properties of the original report item in the Report Library.

A report design may also be generated from one or more templates (e.g., template report or report item). The inheritance properties of templates may operate in the same manner as report items. A template may be copied (or extended) from a set of one or more templates, wherein each of the templates has one or more properties for which values are inherited by each copy of the corresponding one of the templates that is incorporated into a report design. More particularly, the template copy may "extend" the original template in the set of templates. The template copy may then be incorporated into a report design, the report design including a report layout indicating a format in which one or more data items are to be presented. The template copy may inherit a value for each of the properties of the original template. In order to illustrate the inheritance properties of templates, the inheritance properties of report items will be described in further detail below with respect to FIG. 9-FIG. 13.

Figure 9:
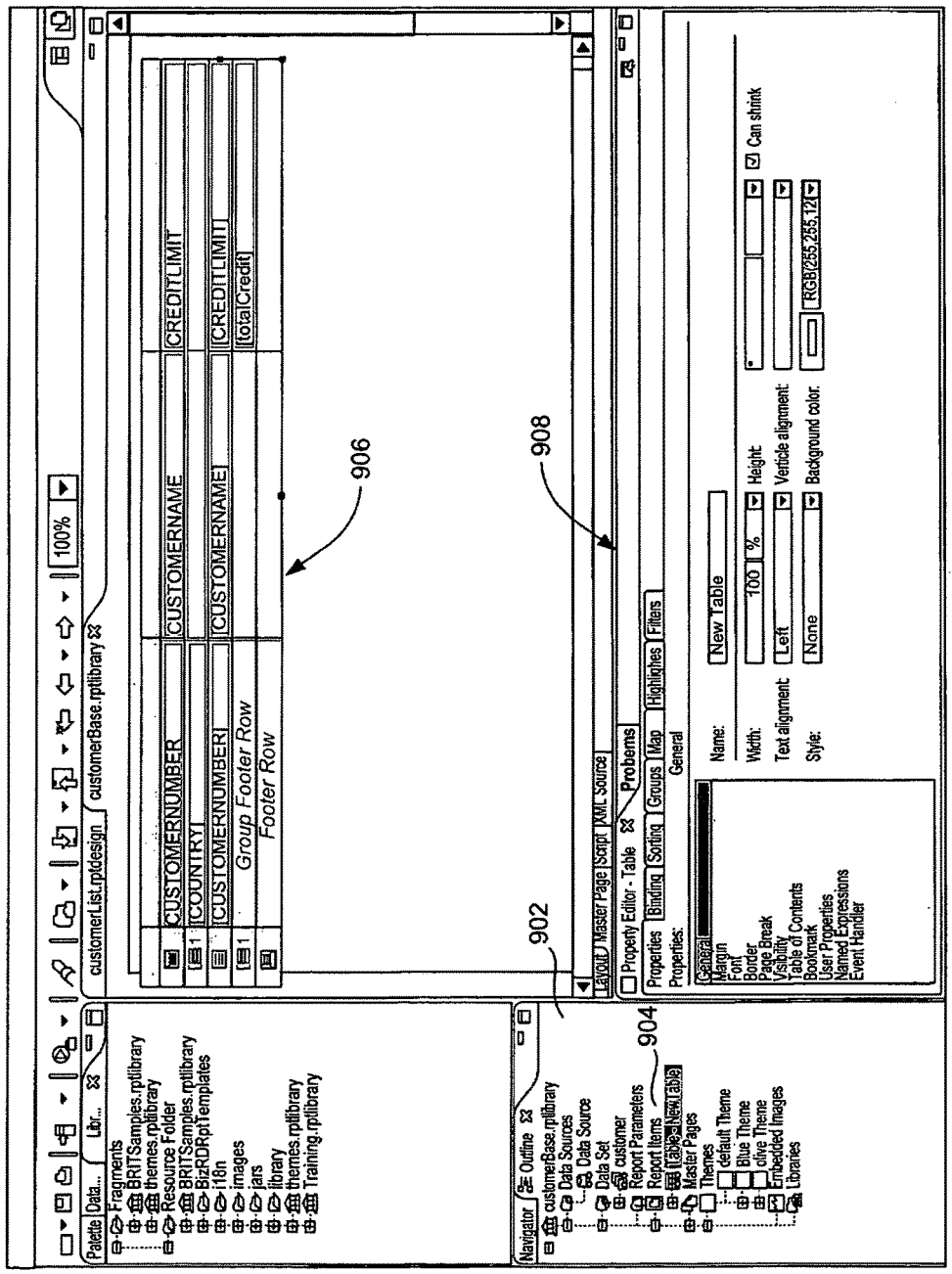
FIG. 9 is a graphical user interface illustrating an example report item.

FIG. 9 is an example report library storing a plurality of report items. More particularly, report library 902 may include one or more report items as shown at 904. More particularly, a report item 906 in this example enables a customer list by country to be generated. A user interface such as that shown at 908 may enable a user to generate or modify properties of a report item in the report library. More particularly, a value associated with one or more properties of the report item may be established or modified. For instance, in this example, the background color is set to yellow.

Figure 10:
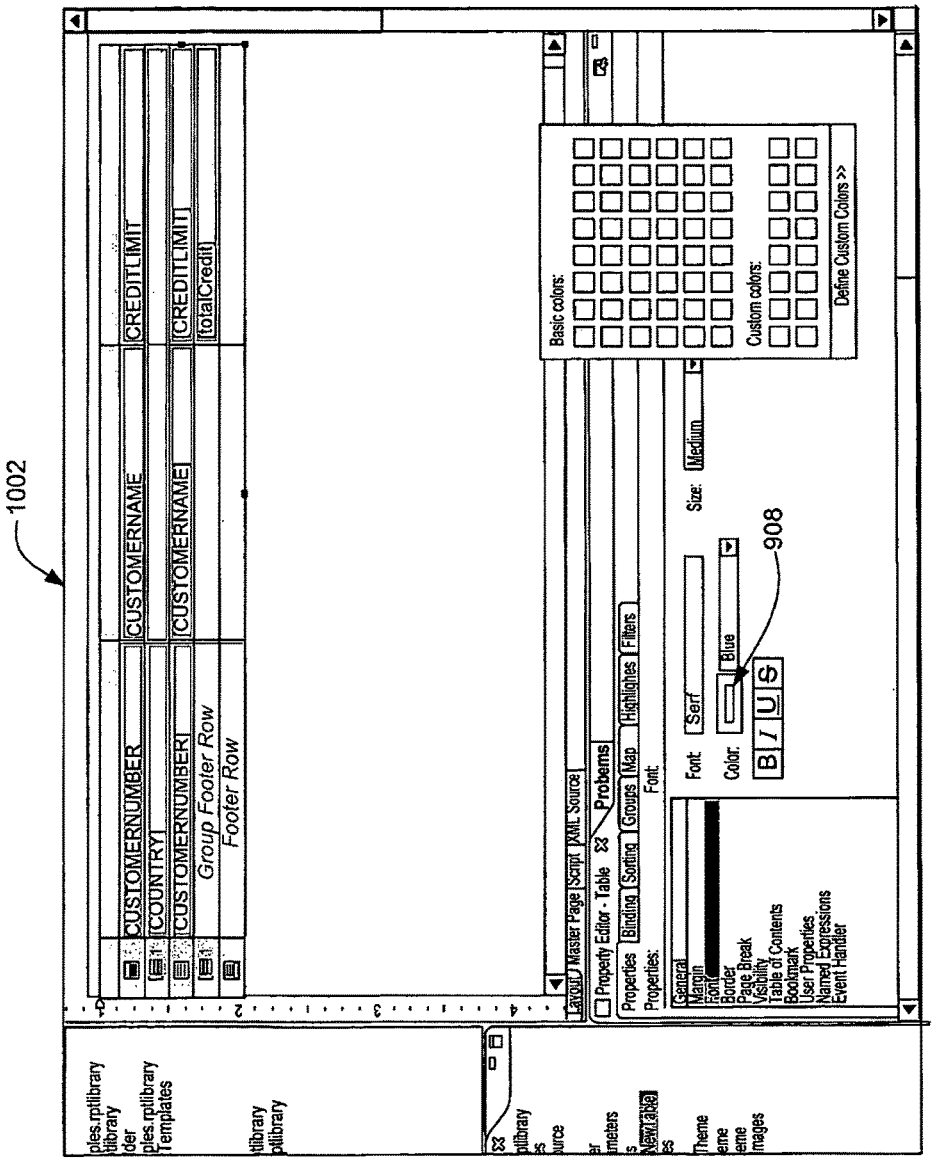
FIG. 10 is a graphical user interface illustrating a report design that includes a report item that inherits properties from the report item shown in FIG. 9.

FIG. 10 is a screenshot illustrating a report design 1002 that incorporates the report item 906 shown in FIG. 9. More particularly, the report design 1002 includes an extended report item that extends the report item 906. As shown, values of properties of the report item 906 are inherited. For instance, the background color of the table remains yellow, as originally established with respect to the template report item 906. Of course, values of the properties extended report item are modifiable via a user interface 908 such that they override the corresponding inherited value. Thus, a user may choose to modify the extended report item in the report design such that a value of at least of the inherited properties is modified. In this example, the user chooses to override the value of one of the properties, font color, via a property editor table. More particularly, the inherited font color is black, but the user chooses to modify the font color to blue. Thus, the user may modify a value of at least one of the properties of the report item such that the value of the modified properties overrides the inherited value of the properties. The report design file may therefore store the values of the properties of the report item, which include the overridden values and any inherited values that have not been overridden.

FIG. 11 is a screen shot illustrating a report that may be generated from the report design file (e.g., XML file) of FIG. 10. As shown in the resulting report, the value of the property background color (yellow) is inherited. Moreover, the value of the property font color has been overridden from black to blue, as set forth above.

Figure 12:
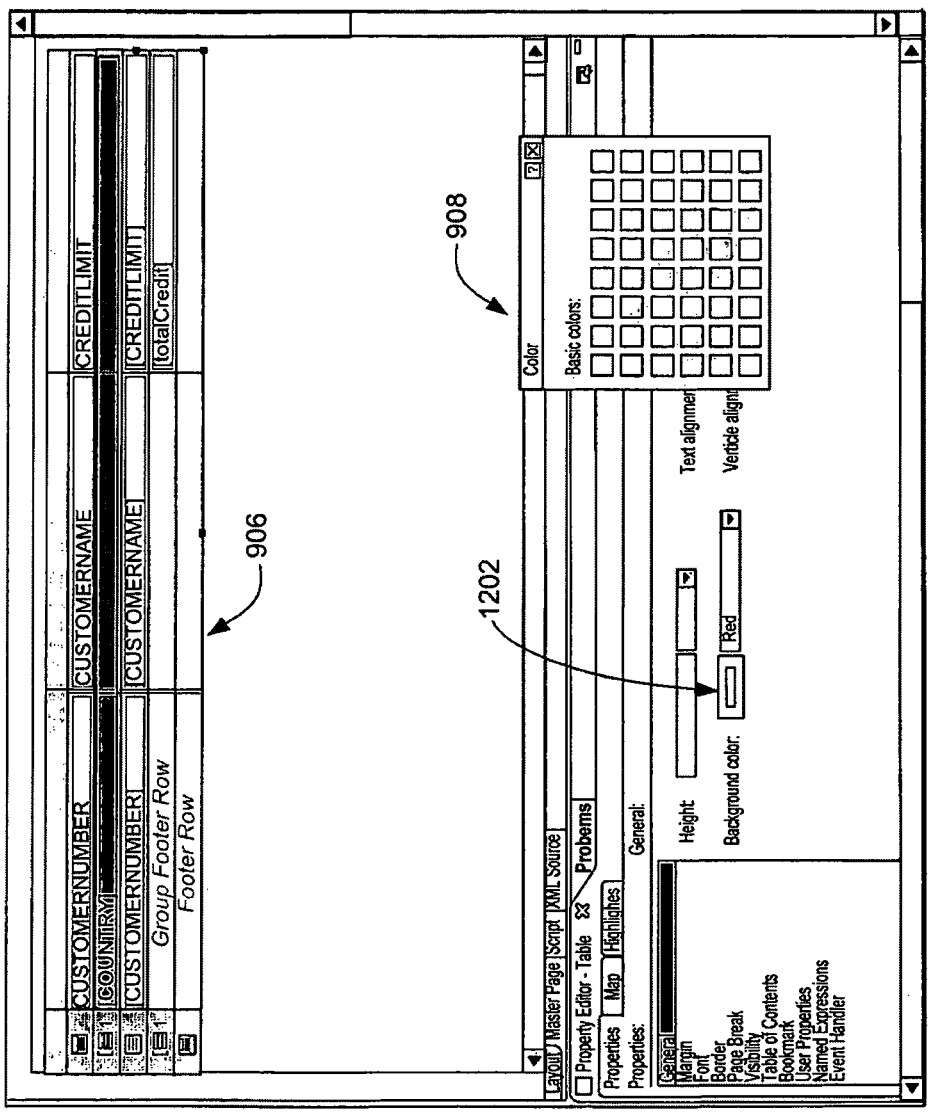
FIG. 12 is a graphical user interface illustrating the report item of FIG. 9 after the report item is modified.

FIG. 12 is a screen shot illustrating the report item 906 in the report library. As set forth above, the background color of the original template report item 906 is yellow, while the font color of the template report item is black. In this example, the user chooses to modify the background color of the row headers of the template report item 906 to red as shown at 1202 via the user interface 908.

FIG. 13 is a screen shot illustrating an example report 1302 that may be generated from the previously generated report design file after the report item 906 has been modified as described above with respect to FIG. 12. As shown in the report, the row headers of the resulting report are shown in red. Thus, the modified property value of the original report item 906 in the report library may be inherited by the extended report item that extends to the report item 906, which was previously incorporated into the report design. In other words, the extended report item existed prior to the modification of the original report item 906 in the report library. Since the user had not modified this property value in the report design, this particular property value is not overridden by another value. In other words, a value of each property of an extended report item that has been modified may override a value of the corresponding property of the report item 906 in a report library that is modified after the report item 906 has been copied. Thus, upon modifying a value of at least one of the properties of a report item in a report library, the modified value of the report item may be reflected in the value of the corresponding one of the properties of the extended report item that extends to the report item in the library.

As set forth above with respect to FIGS. 9-13, an instance or a copy of a report item incorporated into a report design may "extend" a report item in a library by inheriting property values that are not modified in the context of the report design. It is important to note that inheritance may govern values of properties in report items in a report design, regardless of whether the report design is generated before or after the original report item in the library has been modified, if the value of the report item in the report design has not been modified/overridden for the report item in the report design. Moreover, those property values of the report design that are stored need not include those values that have been inherited (and not modified). As a result, valuable storage space in which report designs are stored may be conserved.

Similarly, inheritance properties such as those described above with reference to FIGS. 9-13 may affect property values of an instance (e.g., copy) of a template (e.g., template report or template report item), regardless of whether the copy of the template is generated before or after the original template has been modified) if the value of the template that has been modified has not been modified/overridden for the copy of the template. Inheritance may govern if the original template is maintained in a set of templates, which may be referred to as a template library or report library.

The disclosed embodiments enable a report to be designed and customized at each stage of development. More particularly, individuals such as an engineer/software developer, business user, consumer and/or other end user may collaborate with one another to customize a report. This may be accomplished by sending a report design or template from one individual to another. Alternatively, each individual may access a common web site to customize the report.

The manipulations performed are often referred to in terms, such as storing, modifying, providing, or generating. In any of the operations described herein that form part of the present invention, these operations are machine operations. Useful machines for performing the operations of the present invention may include general-purpose digital computers, networks of such computers, or other programmable devices. In all cases, there is a distinction between the method of operations in operating a computer and the method performed by the computer itself.

The disclosed embodiments also relate to an apparatus for performing these operations. This apparatus may be specially constructed for the required purposes, or it may be a general purpose computer or network of computers selectively activated or reconfigured by a computer program stored on a machine readable medium. The processes presented herein are not inherently related to any particular computer or other apparatus. In particular, various general-purpose machines may be used with programs written in accordance with the teachings herein, or it may be more convenient to construct a more specialized apparatus to perform the required method steps.

Still further, the disclosed embodiments relate to machine-readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

A computer system may include a server and one or more clients. In preferred embodiments, software providing the disclosed functionality is provided on the server and can be accessed through the various clients. The server in accordance with the present invention includes a central processing unit (CPU), input/output (I/O) circuitry, and memory—which may be read only memory (ROM) and/or random access memory (RAM). The server may also optionally include a display, a mass storage unit, a keyboard, and a clock.

In one embodiment, the CPU is one or more microprocessor chips selected from complex instruction set computer (CISC) microprocessors, reduced instruction set computer (RISC) microprocessors, or other available microprocessors. The CPU may be coupled to a memory by a bi-directional data bus, but may also be coupled by a unidirectional data bus in the case of ROM. The memory may also be coupled to the CPU by appropriate control and address busses, as is well known to those skilled in the art.

The CPU may be coupled to the I/O circuitry by a bi-directional data bus to permit data transfers with peripheral devices. I/O circuitry may include a number of latches, registers and direct memory access (DMA) controllers. The purpose of the I/O circuitry is to provide an interface between CPU and such peripheral devices as display assembly, mass storage (e.g., disks), keyboard, and clients. The display assembly of server may receive data from the I/O circuitry via the bus and display that data on a suitable screen. Mass storage can be coupled to I/O circuitry by a bi-directional data bus. Generally, mass storage will be a hard disk drive, a tape drive, or some other long-term storage device. It may be used to store reports, templates, report designs, programs for accessing or generating reports, templates, and report designs, and programs for performing other disclosed functionality.

The keyboard may communicate with the CPU via data bus and I/O circuitry. In addition to a keyboard, other types of input device can also be used in conjunction with the present invention. For example, a computer mouse, a track ball, a track pad, or a pen-based tablet can be used to manipulate a pointer on display screen. A clock may comprise a real-time clock to provide real-time information to the system. Alternatively, the clock can simply provide regular pulses to, for example, an interrupt port of the CPU, which can count the pulses to provide the time function. The clock is coupled to the CPU by a data bus.

The clients may include terminals, personal computers, workstations, minicomputers, and mainframes. For purposes of this invention, any data processing devices that can access templates, reports, report designs or software for performing the disclosed functionality accessible via a server are clients. It should be understood that the clients may be manufactured by different vendors and may also run different operating systems. Clients may be connected to I/O circuitry via bi-directional lines. Bidirectional lines may be any suitable media such as coaxial cable, twisted pair wiring, fiber optic line, radio channels, and the like. Further, the network resulting from the interconnection of the lines may assume a variety of topologies, including ring, bus, star, and may include a collection of smaller networks linked by gateways and bridges. Moreover, the network may include a wireless network. As with the clients, it should be understood that the server may run different operating systems. The clients need not use the same operating system as the server.

Although the foregoing invention has been described in some detail for purposes of clarity of understanding, it will be apparent that certain changes and modifications may be practiced within the scope of the appended claims. For instance, although the specification has described an example employing specific user interfaces, other types of user interfaces may be used as well. Moreover, the implementation of the disclosed methods is merely illustrative, and therefore optimizations or modifications may be performed in other manners as well.

What is claimed is:

1. A method of generating a template for use in generating a report, comprising:

obtaining an identified report item of a report design, wherein the report design is an executable document including a report layout indicating a format in which one or more data items are to be presented by executing the report design, and wherein the identified report item of the report design comprises less than the complete report design; and saving the report item of the report design as a template, the template being a reusable report design component, wherein saving the report item as the template comprises evaluating the executable document including the report layout to determine one or more properties of the report design associated with the report item from the report layout, wherein the template includes the one or more properties for which corresponding values are to be inherited by each copy of the template and saving the identified report item of the report design as the template comprises converting the identified report design of the report design including the one or more properties associated with the report item determined from the report layout to the template such that any report design utilizing that template inherits the one or more properties of that template.

2. The method as recited in claim 1, wherein the template is a template report item.

3. The method as recited in claim 1, wherein a value of each of the properties of an existing copy of the template that has been modified overrides a value of the corresponding one of the properties of the template that is modified after the template has been copied.

4. The method as recited in claim 1, wherein the template generates a report when the template is executed.

5. The method as recited in claim 1, further comprising:
executing the template to generate a report that is viewable by a user.

6. The method as recited in claim 1, wherein saving the identified report item of the report design as a template comprises:
saving the identified report item of the report design as a template with one or more instructions, wherein the one or more instructions are associated with the identified report item of the template.

7. The method as recited in claim 1, wherein saving the identified report item of the report design as a template comprises:
saving the template in a set of templates, wherein each template in the set of templates has one or more properties for which corresponding values are inherited by each copy of the template.

8. The method as recited in claim 1, further comprising:
saving a copy of the template; and
wherein the copy of the template inherits a value for each of the one or more properties of the template.

9. The method as recited in claim 8, further comprising:
modifying a value of at least one of the properties of the copy of the template such that the value of the modified properties overrides the inherited value of the properties.

10. The method as recited in claim 9, further comprising:
modifying a value of at least one of the properties of the template in the set of templates;
wherein the modified value of the template is reflected in the value of the corresponding one of the properties of the copy of the template if the value of the template that has been modified has not been modified for the copy of the template.

11. The method as recited in claim 9, wherein modifying a value of at least one of the properties of the copy of the template is performed via a property editor table.

12. The method as recited in claim 9, further comprising:
saving the copy of the template as a second template;
wherein the properties of the second template are inherited by each copy of the second template.

13. The method as recited in claim 12, further comprising:
obtaining a copy of the second template; and
incorporating the copy of the second template into a report design, wherein each value of the properties of the copy of the second template is modifiable such that it overrides the corresponding inherited value.

14. The method as recited in claim 13, further comprising:
modifying the report design such that a value of at least one of the properties of the copy of the second template are modified.

15. A system for generating a template for use in generating a report, comprising:
a processor; and
a memory, comprising instructions executable on the processor for:
obtaining an identified report item of a report design, wherein the report design is an executable document including a report layout indicating a format in which one or more data items are to be presented by executing the report design, and wherein the identified report item of the report design comprises less than the complete report design; and
saving the report item of the report design as a template, the template being a reusable report design component, wherein saving the report item as the template comprises evaluating the executable document including the report layout to determine one or more properties of the report design associated with the report item from the report layout,
wherein the template includes the one or more properties for which corresponding values are to be inherited by each copy of the template and saving the identified report item of the report design as the template comprises converting the identified report design of the report design including the one or more properties associated with the report item determined from the report layout to the template such that any report design utilizing that template inherits the one or more properties of that template.

16. The system as recited in claim 15, wherein the template is a template report item.

17. The system as recited in claim 15, wherein a value of each of the properties of an existing copy of the template that has been modified overrides a value of the corresponding one of the properties of the template that is modified after the template has been copied.

18. The system as recited in claim 15, wherein the template generates a report when the template is executed.

19. The system as recited in claim 15, wherein the instructions are further for:
executing the template to generate a report that is viewable by a user.

20. The system as recited in claim 15, wherein saving the identified report item of the report design as a template comprises:
saving the identified report item of the report design as a template with one or more instructions, wherein the one or more instructions are associated with the identified report item of the template.

21. The system as recited in claim 15, wherein saving the identified report item of the report design as a template comprises:
saving the template in a set of templates, wherein each template in the set of templates has one or more properties for which corresponding values are inherited by each copy of the template.

22. The system as recited in claim 15, wherein the instructions are further for:
saving a copy of the template; and
wherein the copy of the template inherits a value for each of the one or more properties of the template.

23. The system as recited in claim 22, wherein the instructions are further for:
modifying a value of at least one of the properties of the copy of the template such that the value of the modified properties overrides the inherited value of the properties.

24. The system as recited in claim 23, wherein the instructions are further for:
modifying a value of at least one of the properties of the template in the set of templates;
wherein the modified value of the template is reflected in the value of the corresponding one of the properties of the copy of the template if the value of the template that has been modified has not been modified for the copy of the template.

25. The system as recited in claim 23, wherein modifying a value of at least one of the properties of the copy of the template is performed via a property editor table.

26. The system as recited in claim 23, wherein the instructions are further for:
saving the copy of the template as a second template;
wherein the properties of the second template are inherited by each copy of the second template.

27. The system as recited in claim 26, wherein the instructions are further for:
obtaining a copy of the second template; and
incorporating the copy of the second template into a report design, wherein each value of the properties of the copy of the second template is modifiable such that it overrides the corresponding inherited value.

28. The system as recited in claim 27, wherein the instructions are further for:
modifying the report design such that a value of at least one of the properties of the copy of the second template are modified.

* * * * *